United States Patent
Wu et al.

[19]

[11] Patent Number: 6,005,697
[45] Date of Patent: Dec. 21, 1999

[54] MULTI-WAVELENGTH CROSS-CONNECT OPTICAL NETWORK

[75] Inventors: Kuang-Yi Wu; Jian-Yu Liu, both of Boulder, Colo.

[73] Assignee: Macro-Vision Communications, L.L.C., Boulder, Colo.

[21] Appl. No.: 08/907,551

[22] Filed: Aug. 8, 1997

Related U.S. Application Data

[63] Continuation-in-part of application No. 08/780,291, Jan. 8, 1997, Pat. No. 5,694,233, which is a continuation-in-part of application No. 08/685,150, Jul. 23, 1996, Pat. No. 5,724,165, and application No. 08/739,424, Oct. 29, 1996, Pat. No. 5,867,291.

[51] Int. Cl.$^6$ ....................................................... H04J 14/02
[52] U.S. Cl. ............................ 359/117; 359/128; 359/122
[58] Field of Search ..................................... 357/117, 110, 357/115, 127, 128, 245, 247, 251, 156, 39, 122

[56] References Cited

U.S. PATENT DOCUMENTS

| | | |
|---|---|---|
| 4,650,289 | 3/1987 | Kuwahara . |
| 5,013,140 | 5/1991 | Healey et al. . |
| 5,162,944 | 11/1992 | Yamamoto et al. . |
| 5,694,233 | 12/1997 | Wu et al. ................................. 357/117 |
| 5,724,165 | 3/1998 | Wu ......................................... 359/117 |
| 5,867,291 | 2/1999 | Wu et al. ................................. 359/124 |

*Primary Examiner*—Leslie Pascal
*Attorney, Agent, or Firm*—Dorr, Carson, Sloan & Birney, P.C.

[57] ABSTRACT

An optical cross-connect network provides wavelength routing of optical channels between two arrays of optical fibers carrying WDM signals using interconnected arrays of optical wavelength switches based on combinations of a 1×2 wavelength switch architecture. The cross-connect network can be made by interconnecting two arrays of 1×4 wavelength switches, each of which is made by combining three 1×2 wavelength switches. Each 1×2 optical wavelength switch includes a polarization separation element that decomposes and spatially separates the input signal into two orthogonally-polarized beams, and a wavelength filter that decomposes into the beam pair into two pairs of orthogonally-polarized beams that carry a first spectral band at a first polarization and a second spectral band at an orthogonal polarization. A polarization-dependent routing element spatially separates these four beams into four orthogonally-polarized components. A polarization combining element recombines the beams carrying the first spectral band, and also recombines the beams carrying the second spectral band at the output ports based on the control state of the wavelength switch.

21 Claims, 13 Drawing Sheets

| C0 | 0, | 0, | 1, | 1, |
|---|---|---|---|---|
| C1,C2 | 0,0 | 1,1 | 0,0 | 1,1 |
| Out 1 | 1 | 2 | 3 | 4 |
| Out 2 | 2 | 1 | 4 | 3 |
| Out 3 | 3 | 4 | 1 | 2 |
| Out 4 | 4 | 3 | 2 | 1 |
| | a | b | c | d |

| C0 | 0, | 0, | 1, | 1, |
|---|---|---|---|---|
| C1,C2 | 0,1 | 1,0 | 1,0 | 0,1 |
| Out 1 | 1 | 2 | 4 | 3 |
| Out 2 | 2 | 1 | 3 | 4 |
| Out 3 | 4 | 3 | 1 | 2 |
| Out 4 | 3 | 4 | 2 | 1 |
| | e | f | g | h |

Fig. 10

MULTI-WAVELENGTH CROSS-CONNECT OPTICAL NETWORK

RELATED APPLICATION

The present application is a continuation-in-part of the Applicants' U.S. patent application Ser. No. 08/780,291, n entitled "Switchable Wavelength Router", filed Jan. 8, 1997 now U.S. Pat. No. 5,694,233, which is a continuation-in-part of U.S. patent application Ser. No. 08/685,150 now U.S. Pat. No. 5,724,165, entitled "Fault-Tolerant Optical Routing Switch", filed Jul. 23, 1996, and also a continuation-in-part of U.S. patent application Ser. No. 08/739,424, entitled "Programmable Wavelength Router", filed on Oct. 29, 1996 now U.S. Pat. No. 5,867,291.

BACKGROUND OF THE INVENTION

1. Field of the Invention

The present invention generally relates to optical communication systems, and more particularly, to optical multi-wavelength cross-connect networks for wavelength division multiplex (WDM) optical communications.

2. Statement of the Problem

WDM optical communications systems that can carry information at rates up to terabits per second are becoming the next wave in optical communications development. In current WDM systems, information is optically coded within each of the WDM channels and the network is linked using a point-to-point architecture. Signal routing and switching are performed electronically (i.e., optical information is translated back to electronic format and then processed at each network node). As data rates increase, these opto-electronic and electro-optic conversions are becoming the bottleneck for the network. To improve the efficiency and reduce to cost of networks, routing and switching performed in the optical domain are preferred.

Thus, national and international researches for all-optical networks have become the current focus in the fiber optics industry. A recent technical journal, "Multi-Wavelength Optical Technology and Networks," *Journal of Lightwave Technology* (vol. 14, no. 6, 1996), has gathered about 40 papers reviewing the current status of all-optical networks. Three basic WDM cross-connect networks were listed (shown herein as prior art in FIG. 1) as the basic building blocks for WDM networks. Recently, a national Optical Multi-Wavelength Optical Networking (MONET) Consortium has been formed to study all-optical networks. In its recent demonstration, three all-optical network test beds have been constructed: a WDM long distance test bed; a WDM cross-connect test bed; and a local-exchange test bed (R. C. Alferness, el. al., "MONET: New Jersey demonstration network results," Optical Fiber Conference 1997, Paper WI1, and "All Optical Test Beds Prove National Networking," *Lightwave* (April 1997)). Wavelength cross-connect networks using array waveguide gratings (AWG) together with opto-mechanical space switches and LiNbO3-based cross-connect switches have been used in such networks. International efforts, such as the ACTS (Advanced Communications Technologies and Services) program launched by the European Commission projects, are specifically addressing the problems of trans-European optical transport networks using WDM (M. Berger et al., "Pan-European Optical Networking using Wavelength Division Multiplexing," *IEEE Comm.* Mag. p. 82, (April 1997)). A similar architecture to the MONET project is proposed, except another approach using the wavelength conversion technique is also planned in this European effort.

3. Solution to the Problem

The present invention uses two arrays of unique 1×N wavelength switches to form the wavelength cross-connect network. Because the wavelength filtering and optical switching are accomplished within the same device, the switching elements needed to perform the wavelength cross-connect are reduced and optimized. Furthermore, because the wavelength switch has a built-in complementary spectra characteristic, where a wavelength-slicing concept is used, wavelength collision can be avoided.

SUMMARY OF THE INVENTION

The present invention provides an optical cross-connect network for wavelength routing of optical channels between two arrays of optical fibers carrying WDM signals using interconnected arrays of optical wavelength switches based on combinations of a 1×2 wavelength switch architecture. For example, a cross-connect network can be made by interconnecting two arrays of 1×4 wavelength switches, each of which is made by combining three 1×2 wavelength switches. A tree structure of 1×2 wavelength switches can also be used. Each 1×2 optical wavelength switch has a first polarization separation element (e.g., a birefringent element) that decomposes and spatially separates the input WDM signal into two orthogonally-polarized beams. A first polarization rotator selectably rotates the polarization of one of the beams to match the polarization of other beam, based on an external control signal. A wavelength filter (e.g., stacked waveplates) provides a polarization-dependent optical transmission function such that the first beam decomposes into third and fourth beams with orthogonal polarizations, and the second beam decomposes into fifth and sixth beams with orthogonal polarizations. The third and fifth beams carry a first spectral band at a first polarization and the fourth and sixth beams carry a second spectral band at an orthogonal polarization. A polarization-dependent routing element (e.g., a second birefringent element) spatially separates these four beams into two pairs of horizontally polarized and vertically polarized components. A second polarization rotator rotates the polarizations of the beams so that the third and fifth beams, and the fourth and sixth beams are orthogonally polarized. A polarization combining element (e.g., a third birefringent element) recombines the third and fifth beams (i.e., the first spectral band), and also recombines the fourth and sixth beams (i.e., the second spectral band) which are coupled to the output ports based on the control state of the wavelength switch.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which:

FIG. 1a is a fixed N×N×M wavelength cross-connect network. FIG. 1b is a rearrangeable WDM cross-connect network using space division switches 25. FIG. 1c is a wavelength-interchanging cross-connect network using wavelength converters 27.

FIG. 3a is a simplified block diagram of a 1×4 wavelength switch.

FIG. 3b is a table of the eight eigen states corresponding to the three control bits of the 1×4 wavelength switch 100, 200 shown in FIG. 3a.

In FIG. 7a, spectra of the output port 1 are recorded before and after switching. FIG. 7b shows the corresponding spectra of the output port 2 before and after switching. The spectra are roughly equally separated.

FIG. 10 is the table showing each of the 32 possible control states of the four 1×4 wavelength switches in the input array 100 and the four 1×4 wavelength switches in the output array 200 of the 4×4×4λ wavelength cross-connect network in FIG. 8.

DETAILED DESCRIPTION OF THE INVENTION

Figure 1A:
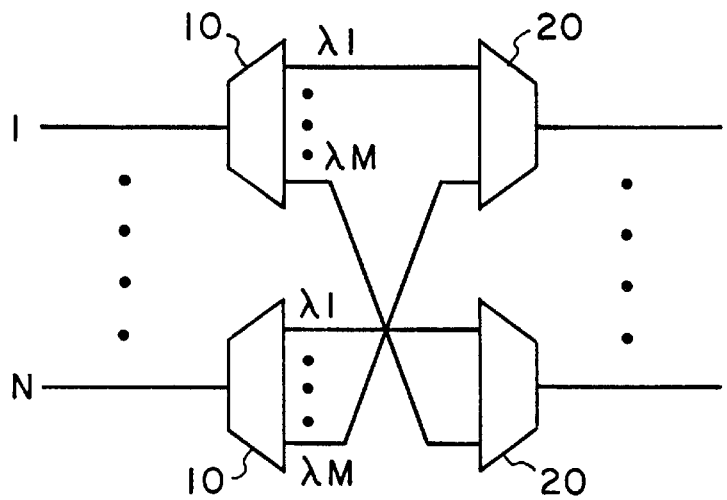
FIGS. 1a through 1c are simplified block diagrams illustrating the three basic schemes for WDM cross-connect switches.
Figure 1B:
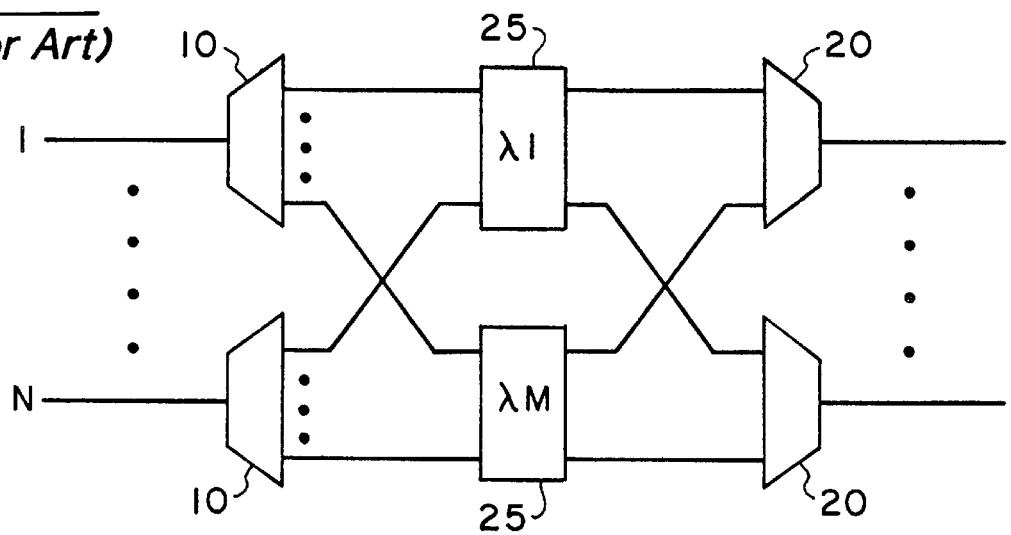
Figure 1C:
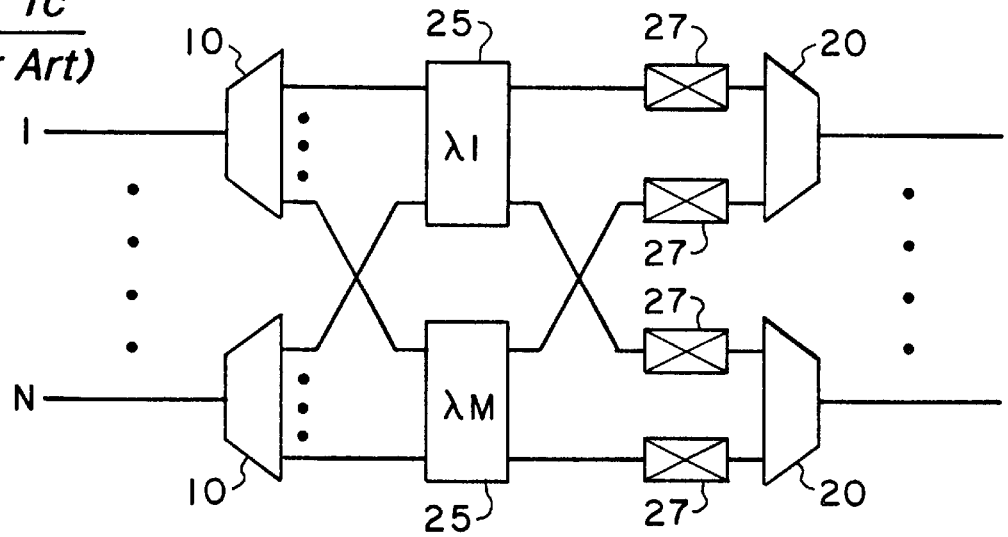

FIGS. 1a through 1c are simplified block diagrams illustrating the three basic schemes for WDM cross-connect switches. FIG. 1a is a fixed N×N×M wavelength cross-connect network. N optical fibers carrying M optical channels are input to a first array 10 of 1×M wavelength filters. Each wavelength filter in the first array 10 separates its input WDM signal into M output channels. The outputs from the first array 10 are interconnected in a fixed arrangement with the input ports of a second array 20 of M×1 wavelength filters as shown in FIG. 1a. Each wavelength filter in the second array 20 combines M input channels into a single output. In contrast to FIG. 1a, FIG. 1b is a block diagram of a rearrangeable WDM cross-connect network using space-division optical switches 25 to permutate the wavelength channels between the input and output arrays 10, 20. FIG. 1c is a wavelength-interchanging cross-connect network using wavelength converters 27.

Figure 2:
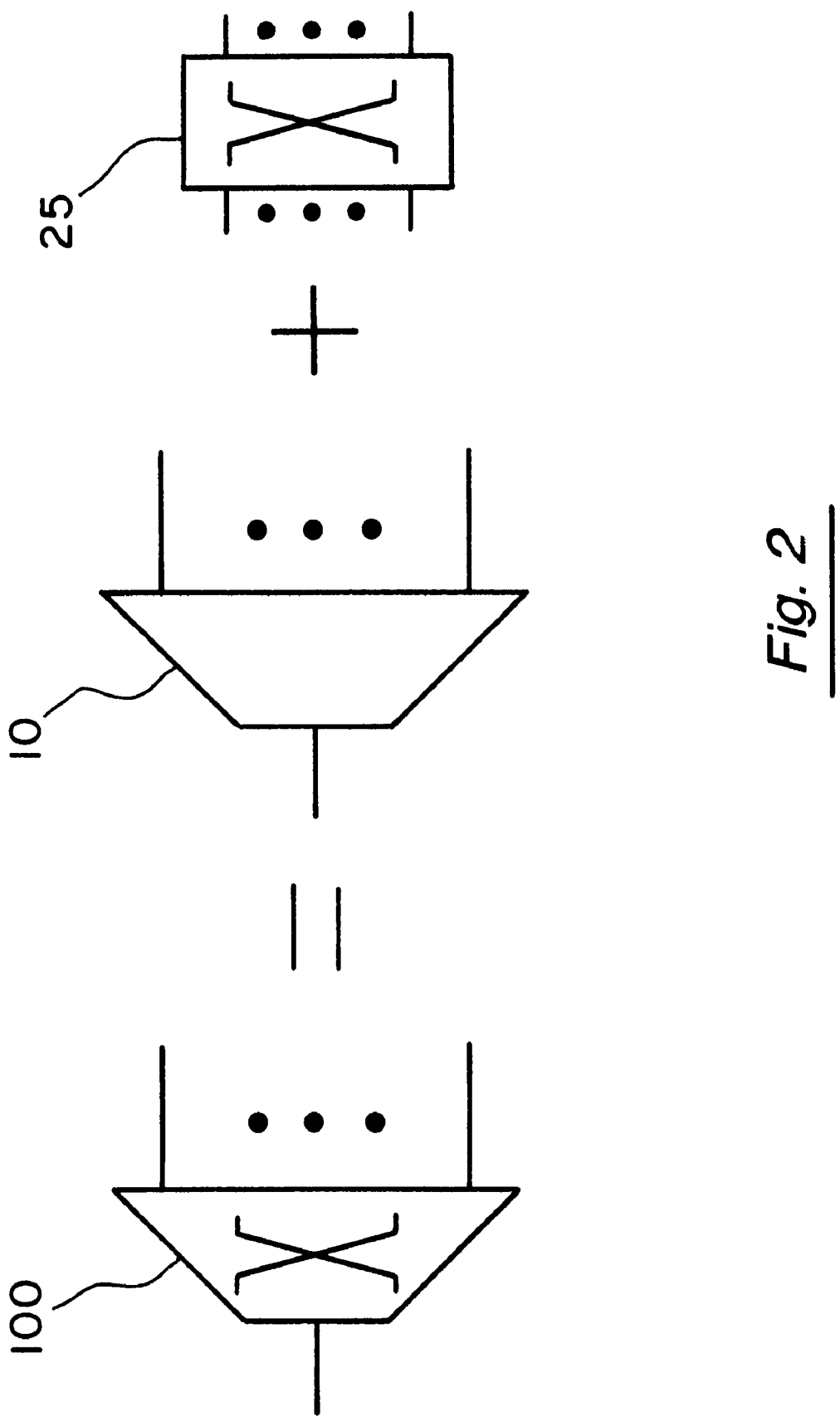
FIG. 2 is simplified block diagram of a 1×N wavelength switch used in this invention. It has functional characteristics that are equivalent to a combination of an optical filter 10 and space-division switch 25 in FIGS. 1b and 1c.
Figures 3A, 3B:
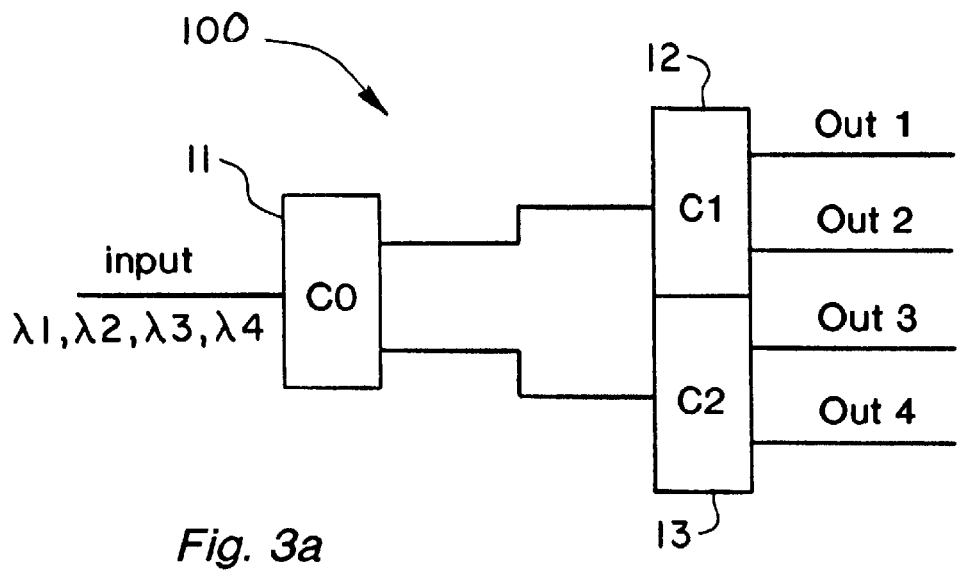

In contrast to the prior art, the present invention employs a unique 1×N wavelength switch to construct the cross-connect network. The preferred embodiment of the present invention uses two arrays of such 1×4 wavelength switches. FIG. 2 is a simplified block diagram illustrating a wavelength switch 100 that has functional characteristics equivalent to the combination of a filter 10 and a space-division switch 25 in FIGS. 1b and 1c. FIG. 3a show more detail of a 1×4 wavelength switch using 1×2 wavelength switches 11, 12, and 13. Each 1×2 wavelength switch 11, 12, 13 is controlled by one control bit and hence has two control states. Therefore, the 1×4 wavelength switch has three control bits (C0, C1, and C2) that result in eight ($2^3$) different output combinations. These eight combinations are designated "a" through "h", respectively, in FIG. 3b.

Figure 9:
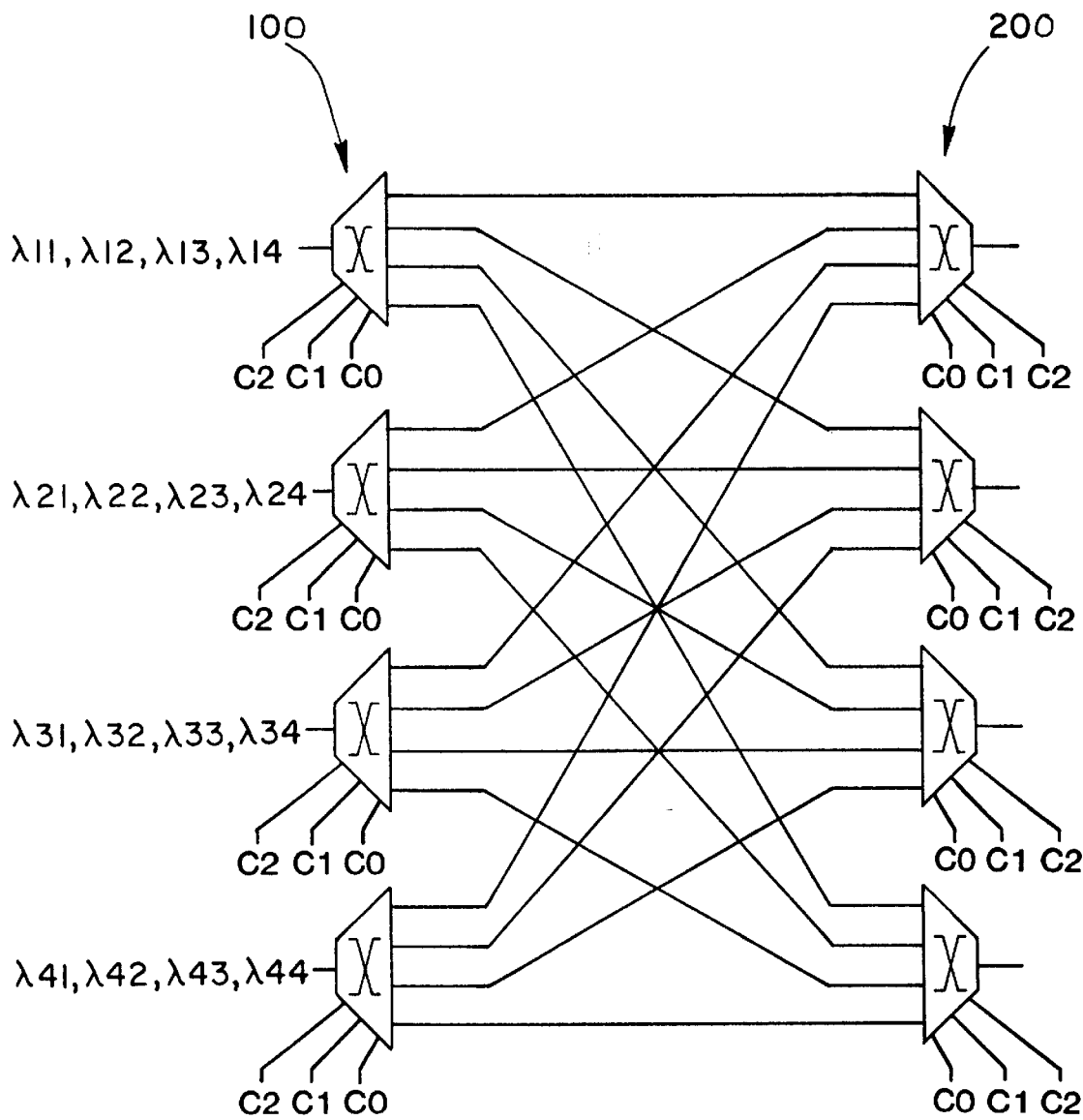
FIG. 9 is a simplified block diagram of a 4×4×4λ wavelength cross-connect network implemented using two interconnected arrays of 1×4 wavelength switches 100 and 200.
Figure 10:
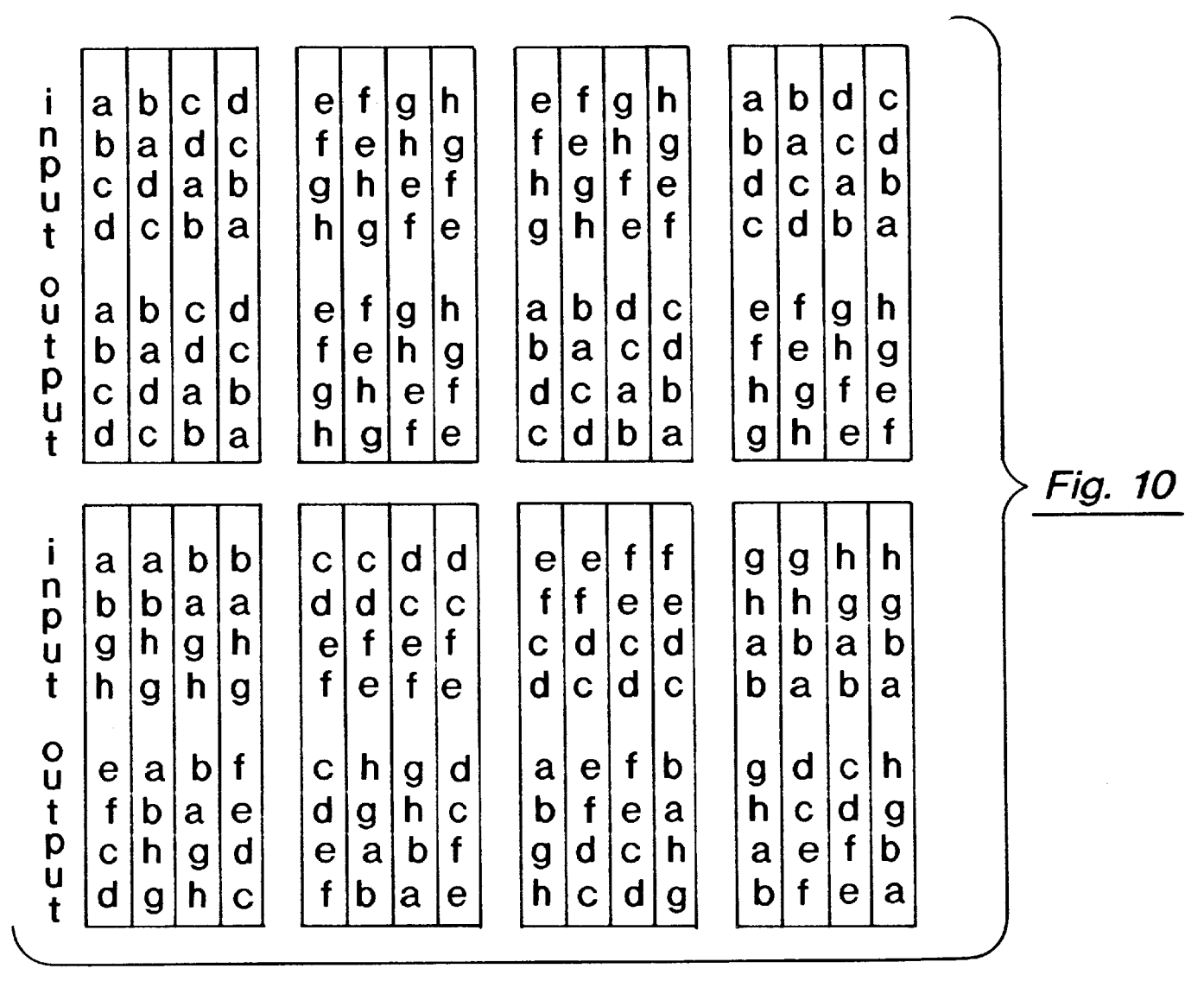

These 1×4 wavelength switches are used to form the 4×4×4λ wavelength cross-connect network illustrated in FIG. 9. By placing two arrays of four 1×4 wavelength switches 100, 200 back to back, as shown in FIG. 9, a 4×4×4λ optical wavelength cross-connect network can be created. It should be noted that the 1×4 wavelength switches in the present invention are inherently bidirectional, so that the order of the input port and the output ports can be reversed to permit light to pass in either direction through the switch. The allowed states for this wavelength cross-connect network are shown in FIG. 10, where "a" through "h" represent the optical channel arrangements listed in FIG. 3b for each 1×4 wavelength switch in the two arrays 100, 200. A total of 32 different combinations are allowed without running into the wavelength collision or recombination problems.

With conventional designs using separated wavelength filters and space crossbar switches, a total of eight 1×4 wavelength filters and one 16×16 crossbar switch (or four 4×4 switches) are needed. Although, this design provides higher freedom of routing, many of the switching states are redundant, or may result in wavelength collision that renders some of these states unusable. The total number of components used in these conventional configurations is also greater than the current invention, therefore increasing the cost of the wavelength crossbar network.

Figure 4A:
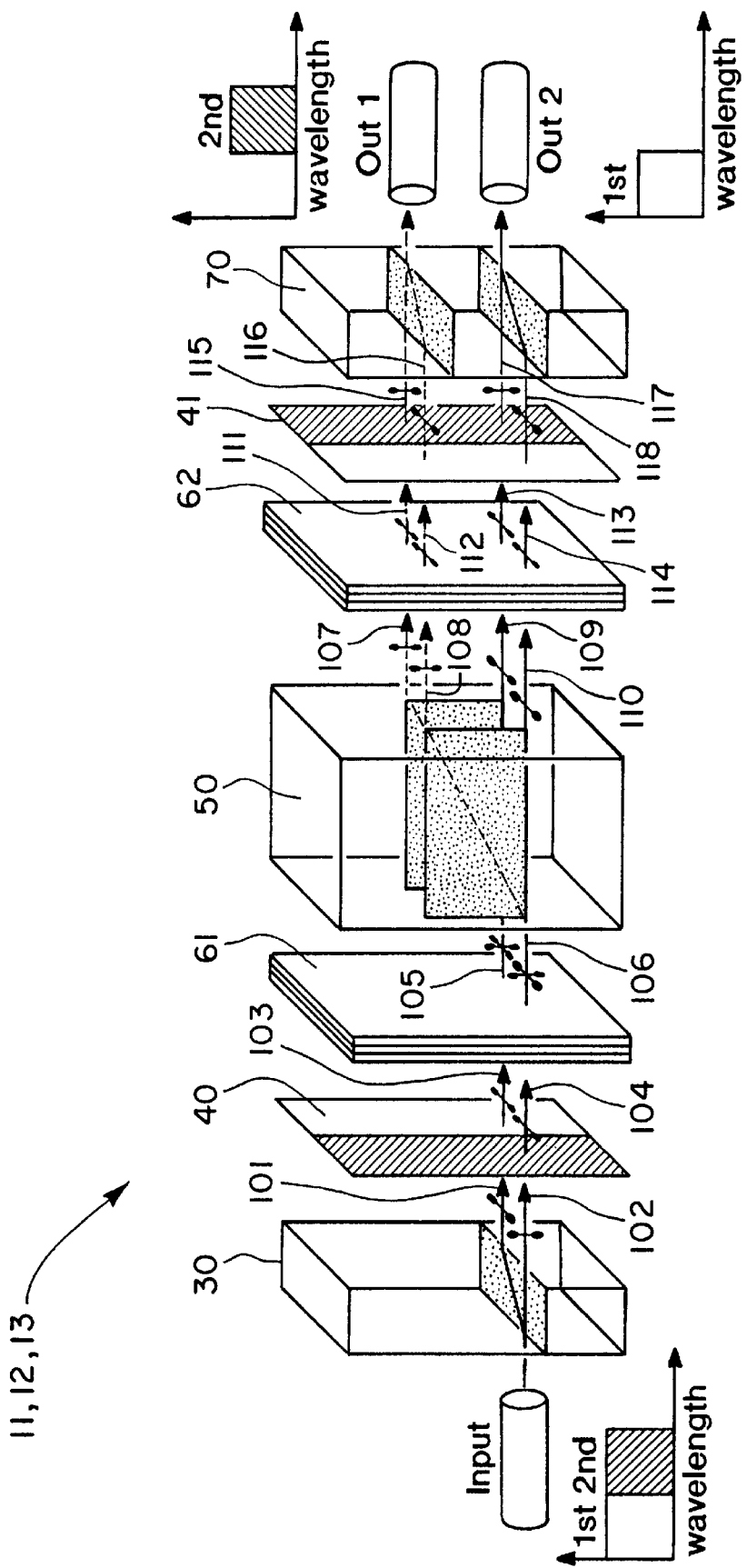
FIGS. 4a and 4b are simplified schematic diagrams illustrating a double-stage 1×2 wavelength router switch 11, 12, 13 in accordance with the present invention.
Figure 4B:
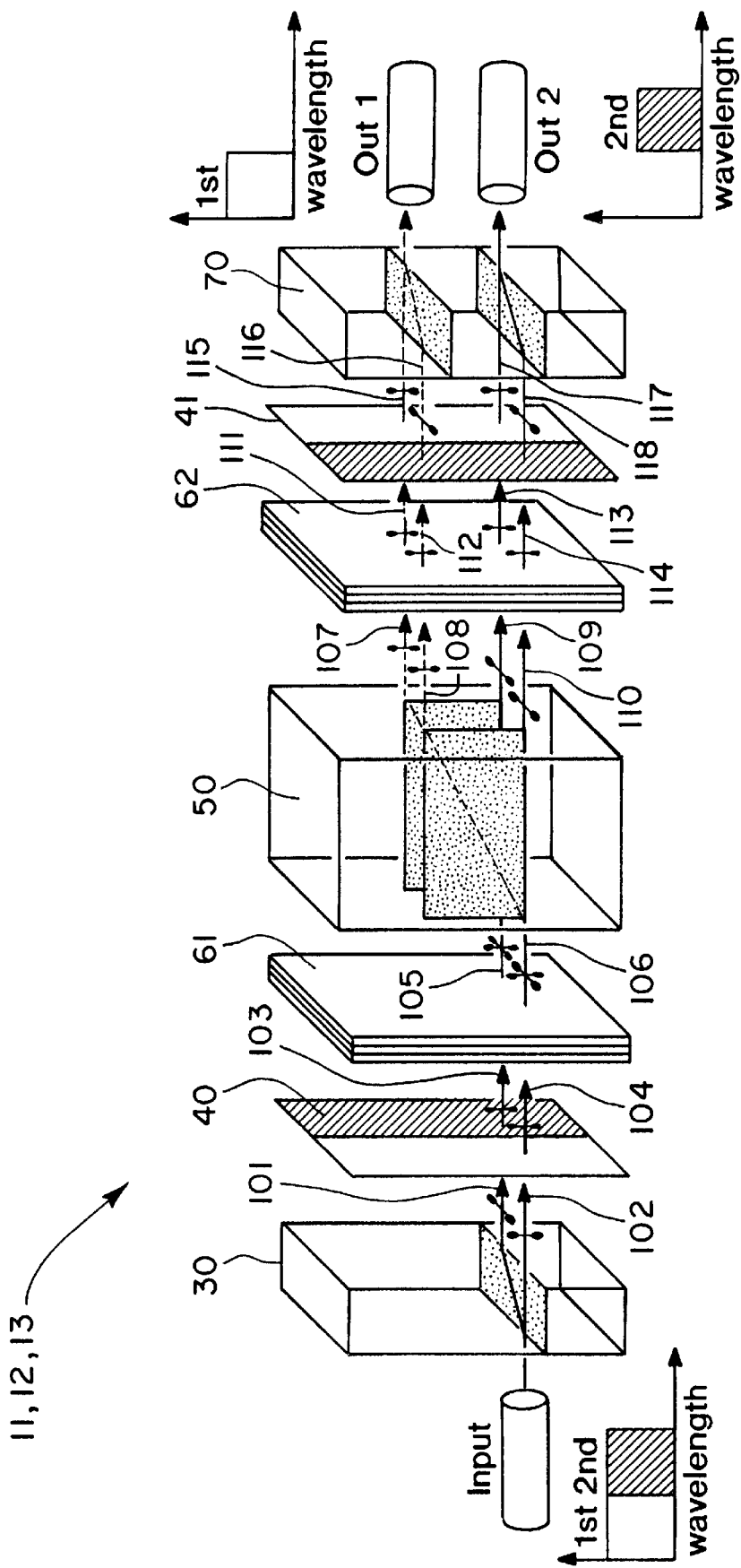

1×2 Wavelength Switch. FIG. 4a and FIG. 4b are schematic diagrams illustrating the two control states of a 1×2 wavelength switch 11, 12, and 13, which is one of the fundamental building blocks used in construction of the 1×4 wavelength switch 100 in FIG. 2. Each 1×2 wavelength switch 11, 12, 13 is under binary control from a control bit and hence has two control states. The 1×2 wavelength switch serves to separate channels of the wavelength spectrum applied to the input port and determines which of the two output ports are coupled to each channel.

In FIG. 4a and FIG. 4b, the bold solid lines indicate optical paths that contain the full spectrum of channels in the input WDM signal. Solid thin lines indicate optical paths of signals containing a first subset of channels labeled as the first spectral band. Thin dashed lines indicate the optical channels carrying a second subset of channels referred to as the second spectral band. It is important to understand that each of the subsets may comprise more than one channel and may itself be a WDM signal although having a smaller bandwidth than the original WDM signal. Each of the optical paths is further labeled with either a horizontal double-headed line indicating horizontal polarization, or a vertical double-headed line indicating vertical polarization, or both horizontal and vertical double-headed lines indicating mixed horizontal and vertical polarizations in the optical signal at that point.

The input WDM signal enters the first polarization separation element 30 (e.g., a birefringent element or polarized beamsplitter) that spatially separates horizontal and vertically polarized components of the input WDM signal. The birefringent material allows the vertically polarized portion of the optical signal to pass through without changing course because they are ordinary waves in the birefringent element 30. In contrast, horizontally polarized waves are redirected at an angle because of the birefringent walk-off effect. The angle of redirection is a well-known function of the particular materials chosen. Examples of materials suitable for construction of the birefringent element include calcite, rutile, lithium niobate, $YVO_4$-based crystals, and the like. The horizontally polarized component travels along a path 101 as an extraordinary signal in the first polarization separation element 30 while the vertically polarized component 102 travels as an ordinary signal and passes through without spatial reorientation. The resulting signals 101 and 102 both carry the full frequency spectrum of the input WDM signal.

Both the horizontally and vertically polarized components 101 and 102 are coupled to a switchable polarization rotator 40 under control of a control bit. The polarization rotator 40 consists of two sub-element rotators that form a complementary state, i.e. when one turns on the other turns off. The rotator 40 selectively rotates the polarization state of either signal 101 or 102 by a predefined amount. In the preferred embodiment, the rotator 40 rotates the signals by either 0° (i.e., no rotation) or 90°. For example, the polarization rotator 40 can be a twisted nematic liquid crystal rotator, ferroelectric liquid crystal rotator, pi-cell based liquid crystal rotator, magneto-optic based Faraday rotator, acousto-optic or electro-optic based polarization rotator. Commercially available rotators based on liquid crystal technology are preferred, although other rotator technologies may be applied to meet the needs of a particular application. The switching speed of these elements ranges from a few milliseconds to nanoseconds, and therefore can be applied to a wide variety of systems to meet the needs of a particular application. These and similar basic elements are considered equivalents and may be substituted and interchanged without departing from the spirit of the present invention.

FIG. 4a illustrates the control state in which the signal 102 is rotated by 90° so that both signals 103, 104 exiting the rotator 40 have a horizontal polarization. FIG. 2b illustrates the second control state in which the polarization of the signal 101 is rotated by 90° so that both optical signals 103, 104 exiting the rotator 40 have a vertical polarization. Again, at this stage, both the horizontal and vertical components contain the entire frequency spectrum of channels in the input WDM signal.

The stacked waveplates element 61 is a stacked plurality of birefringent waveplates at selected orientations that generate two eigen states. The first eigen state carries a first sub-spectrum with the same polarization as the input, and the second eigen state carries a complementary sub-spectrum at the orthogonal polarization. The polarization of the incoming beam and the two output polarizations form a pair of spectral responses, where (H, H) and (V, V) carry the first part of the input spectrum and (H, V) and (V, H) carry the complementary (second) part of the input spectrum, where V and H are vertical and horizontal polarization, respectively.

This may be better understood by comparing FIGS. 4a and 4b. With horizontal polarizations 103, 104 input to the stacked waveplates element 61 as shown in FIG. 4a, orthogonal vertical and horizontal polarizations are generated with the first spectral band residing in horizontal polarization and the second spectral band residing in vertical polarization. With vertical polarizations 103, 104 input to the stacked waveplates element 61 as shown in FIG. 4b, orthogonal vertical and horizontal polarizations are generated with the first spectral band residing in vertical polarization and the second spectral band residing in horizontal polarization.

For wavelength demultiplexing applications, the stacked waveplates element 61 has a comb filter response curve with a substantially flat top or square wave spectral response. For WDM optical channel add/drop applications, the stacked waveplates element 61 has an asymmetric filter response.

Returning to FIG. 4a, the pairs of optical responses 105, 106 output by the stacked waveplates element 61 are coupled to a polarization-dependent routing element 50 (e.g., a second birefringent element or a polarized beamsplitter). This polarization-dependent routing element 50 spatially separates the horizontally and vertically polarized components of the input optical signals 105 and 106. As shown in FIG. 4a, the optical signals 105, 106 are broken into vertically polarized components 107, 108 containing the second spectral band and horizontally polarized components 109, 110 containing the first spectral band. Due to the birefringent walk-off effect, the two orthogonal polarizations that carry first spectral band 109, 110 in horizontal polarization and second set spectral band 107, 108 in vertical polarization are separated by the polarization-dependent routing element 50.

Following the polarization-dependent routing element 50, the optical elements on the input side of the polarization-dependent routing element 50 can be repeated in opposite order, as illustrated in FIGS. 4a and 4b. The second stacked waveplates element 62 has substantially the same composition as the first stacked waveplates element 61. The horizontally polarized beams 109, 110 input to the second stacked waveplates element 62, are further purified and maintain their polarization when they exit the second stacked waveplates element 62. On the other hand, the vertically polarized beams 107, 108 experience a 90° polarization rotation and are also purified when they exit the second stacked waveplates element 62. The 90° polarization rotation is due to the fact that the vertically polarized beams 107, 108 carry the second spectral band and therefore are in the complementary state of element 62. At the output of the stacked waveplates element 62, all four beams 111, 112 and 113, 114 have horizontal polarization. However, the spectral bands defined by the filter characteristics of the stacked waveplates elements 61,62 are separated with the second spectral band 501 on top and the first spectral band 502 below.

To recombine the spectra of the two sets of beams 111, 112 and 113, 114, a second polarization rotator 41 and a polarization combining element 70 (e.g., a third birefringent element or a polarized beamsplitter) are used. Again, the second rotator 41 has two sub-elements that intercept the four parallel beams 111–114. The two sub-elements of the second rotator 41 are set at a complementary state to the first rotator 40, i.e. when the first rotator 40 is turned on/off, the second rotator 41 is turned off/on. In the case of FIG. 4a, the polarization of beams 111 and 113 is rotated by 90°, and beams 112 and 114 are passed without change of polarization. This results an orthogonal polarization pair 115, 116 and 117, 118 for each spectral band at the output of the second rotator 41. Finally, a polarization combining element 70 (e.g., a third birefringent element) recombines the two orthogonal polarizations 115, 116 and 117, 118 using the walk-off effect to produce two spectra that exit at ports 14 and 13, respectively. This completes the first control state of the 1×2 wavelength router.

FIG. 4b shows the other control state in which the two polarization rotators 40 and 41 have switched to their complimentary states, i.e. from on to off, or off to on, in contrast to their states shown in FIG. 4a. The full input spectrum is first divided by polarization into two orthogonal states, i.e. vertical and horizontal polarization as indicated at 101 and 102, by the first polarization separation element 30.

The first polarization rotator 40 is now set to have the output polarizations 103 and 104 both vertical. After passing through the first stacked waveplates element 61, two orthogonal polarizations (i.e., horizontal and vertical) that carry second and first spectral bands are generated, respectively. In this state of operation, horizontal polarization is used to carry the second spectral band, and vertical polarization is used to carry the first spectral band of the input WDM spectrum. The two spectral bands are then spatially separated by the polarization-dependent routing element 50 with vertical polarization 107, 108 going upward and horizontal polarization 109, 110 passing through without deviation. This, therefore, separates the two spectral bands according to their polarizations.

The four resulting beams 107–110 enter the second stacked waveplates element 62 for further spectral purification. Another important role of element 62 is its polarization rotation for the second spectral band. Remember that the stacked waveplates elements 61, 62 have two eigen states. With regard to the first band, the vertically polarized beams 107, 108 remain unchanged by element 62. However, with regard to the second spectral band, the horizontally polarized beams 109 and 110 are rotated by 90° as they pass through element 62 because they are in the complementary state of the stacked waveplate 62. At the output of element 62, all polarizations become vertical, as indicated by beams 111, 112 for the first spectral band and beams 113, 114 for the second spectral band in FIG. 4b. To recombine the two sub-spectra, a second polarization rotator 41 and a polarization combining element 70 are used, as previously discussed. In the case of FIG. 4b, the second rotator 41 is set to rotate the polarizations of beams 112 and 114 by 90° and to pass beams 111 and 112 without rotation. The resulting beams 115–118 are recombined by the polarization combining element 70 and exit at the output ports 1 and 2 for the first and second spectral bands, respectively.

Figure 5A:
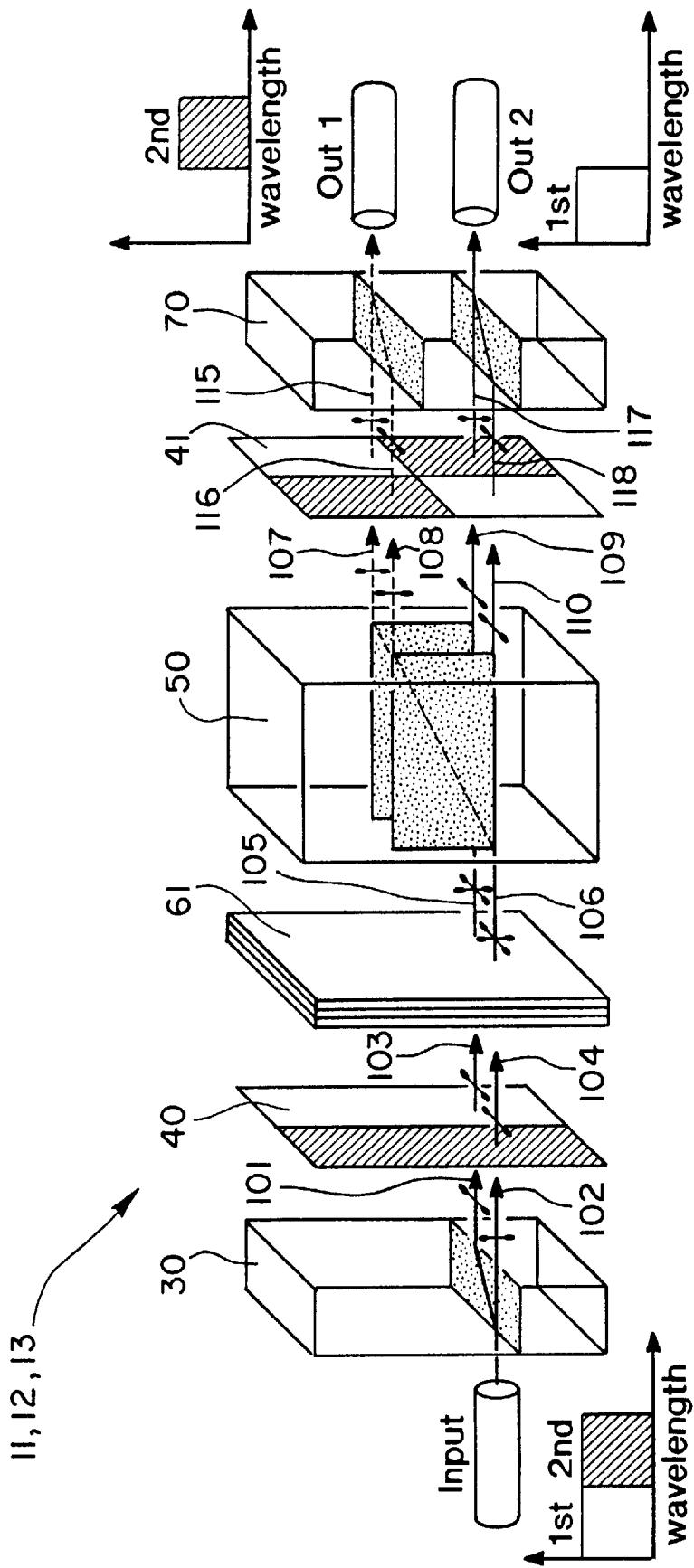
FIGS. 5a and 5b are simplified schematic diagrams illustrating a single-stage 1×2 wavelength router switch 11, 12, 13 in accordance with the present invention.
Figure 5B:
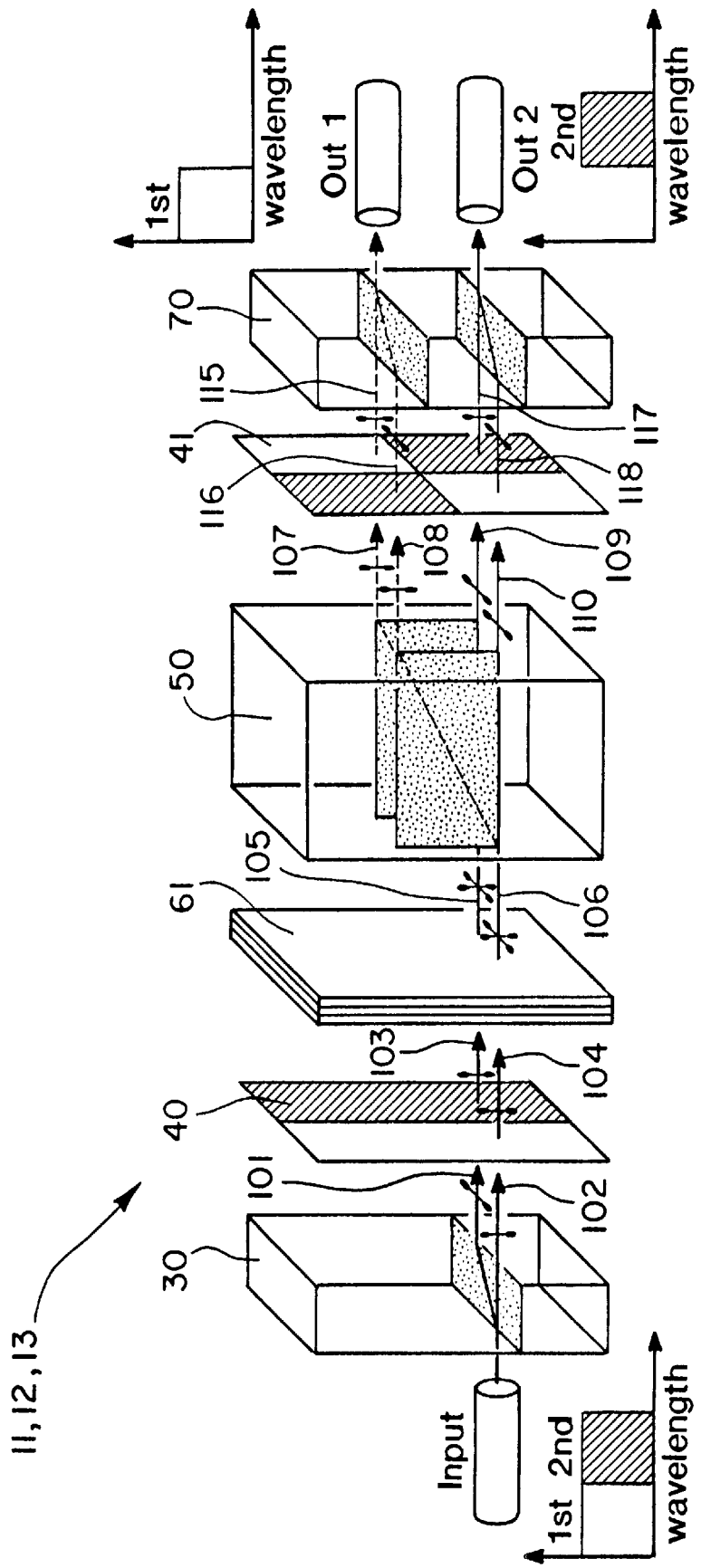

FIGS. 5a and 5b show the two control states of a simplified, alternative embodiment of the 1×2 wavelength router switch. In contrast to the double-stage design previously discussed, the embodiment depicted in FIGS. 5a and 5b is a single-stage switchable wavelength router that incorporates two changes. The second stacked waveplates element 62 in FIGS. 4a and 4b has been removed and the second polarization rotator 41 has been replaced with a passive polarization rotator with two sub-elements to intercept the beams 108 and 109, as shown in FIGS. 5a and 5b.

The single-stage wavelength router switch operates in substantially the same manner as the double-stage router until the beams 107–110 exit the polarization-dependent routing element 50. At the output of the polarization-dependent routing element 50, the divided first and second spectral bands are carried by two sets of orthogonally polarized beams 107, 108 and 109, 110, respectively. The positions of the first and second spectral bands depend on the polarization state of the beams 103 and 104. If the first spectral band is horizontally polarized by the first rotator 40, it will exit at the lower output port 2 and the second spectral band will exit at the upper output port 1. If the first spectral band is vertically polarized by the first rotator 40, it will exit at the upper output port 1 and the second spectral band will exit at the lower output port 2. Because of the birefringent walk-off effect in the polarization-dependent routing element 50, the vertically polarized light beams 107, 108 deviate from their original paths and travel upward, whereas the horizontally polarized beams 109, 110 pass through element 50 without changing their directions. The two pairs of beams 107, 108 and 109, 110 exiting the polarization-dependent routing element 50 have the same polarization but different frequencies.

The passive polarization rotator 41 is patterned to rotate polarization only in the areas that intercept beams 108 and 109. Therefore, at the output of the rotator 41, orthogonally polarized pairs of beams 115, 116 and 117, 118 are produced for both the first and second spectral bands. These beams 115–118 are then recombined by the polarization combining element 70 and exit at output ports 2 and 1.

The single-stage switchable wavelength router has the advantages of requiring fewer components as compared to the double-stage router. However, its spectral purity is not as good as the double-stage router. It will depend on the applications and requirements of a specific WDM network, whether the single stage or the double stage wavelength router is preferred.

One advantage of the present invention is that routing is accomplished while conserving substantially all optical energy available in the input WDM signal. That is to say, regardless of the polarization of the signals in input WDM signal both the horizontal and vertically polarized components are used and recombined at the output ports resulting in very low loss through the router.

Figure 7A:
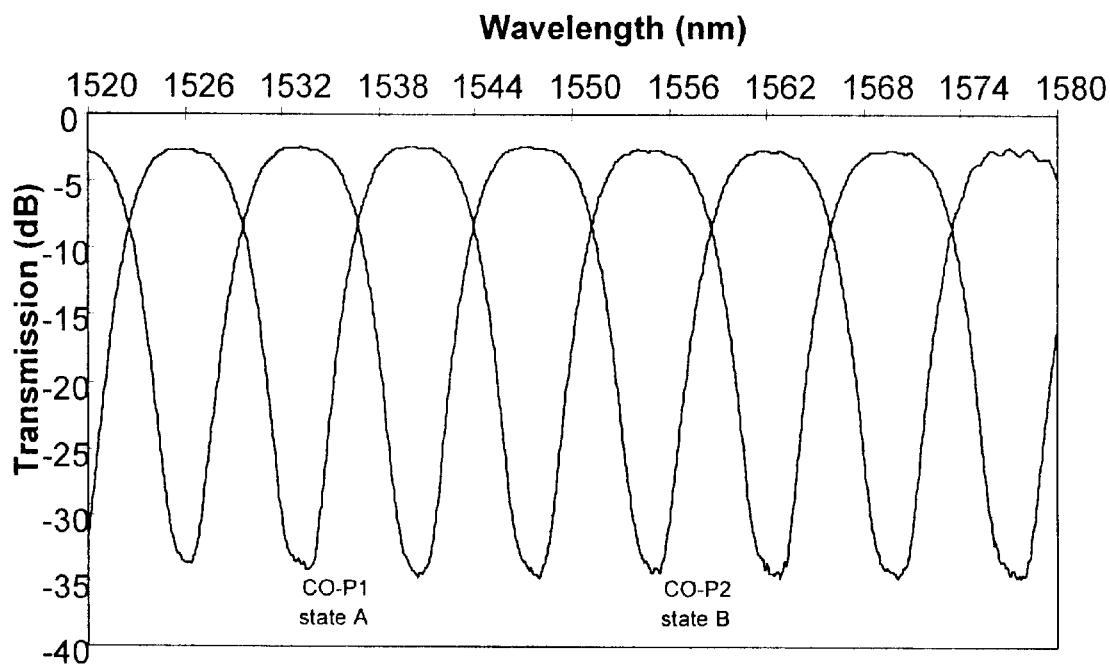
FIGS. 7a and 7b are graphs showing experimental results using three lithium niobate waveplates in the filter design.
Figure 7B:
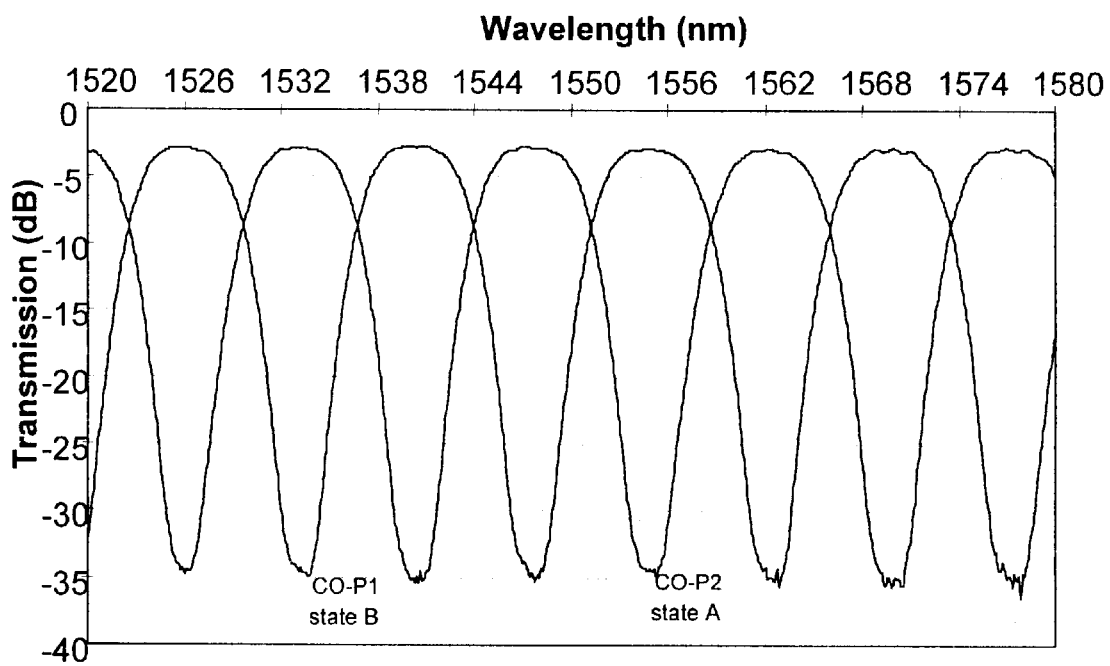

Each set of birefringent waveplates used in the wavelength filters is oriented at an unique optic axis angle with respect to the optical axis of polarization rotator 40. FIGS. 7a and 7b are graphs showing examples of the transmission characteristics of a stacked waveplates element with equally separated sub-spectra having a channel spacing of about 8 nm. Three lithium niobate ($LiNbO_3$) waveplates having a thickness of 1 mm have been stacked together to form a flat-top, equally divided spectrum, as shown in FIGS. 7a and 7b, with channel crosstalk under 30 dB. The experimental results are based on the double-stage switchable wavelength router. This outperforms existing filter technologies, such as using multi-layer dielectric coatings, where a 20 dB crosstalk is generally obtained. Because of the equal spectra design at the two output ports, this type of switchable wavelength router can be further cascaded. With N stages of routers cascaded, a total of $2^N$ output ports result, as illustrated in FIG. 3a. These $2^N$ ports can have their output spectra permuted according to N control signals to create a programmable wavelength router.

It should be noted that this 1×2 wavelength switch is inherently bidirectional, as previously discussed, so that light can pass either from the input port to the output ports or from the output ports to the input port. This enables the 1×2 wavelength switch to be used as a component in fabrication of bidirectional 1×4 wavelength switches and cross-connect networks.

Figure 6:
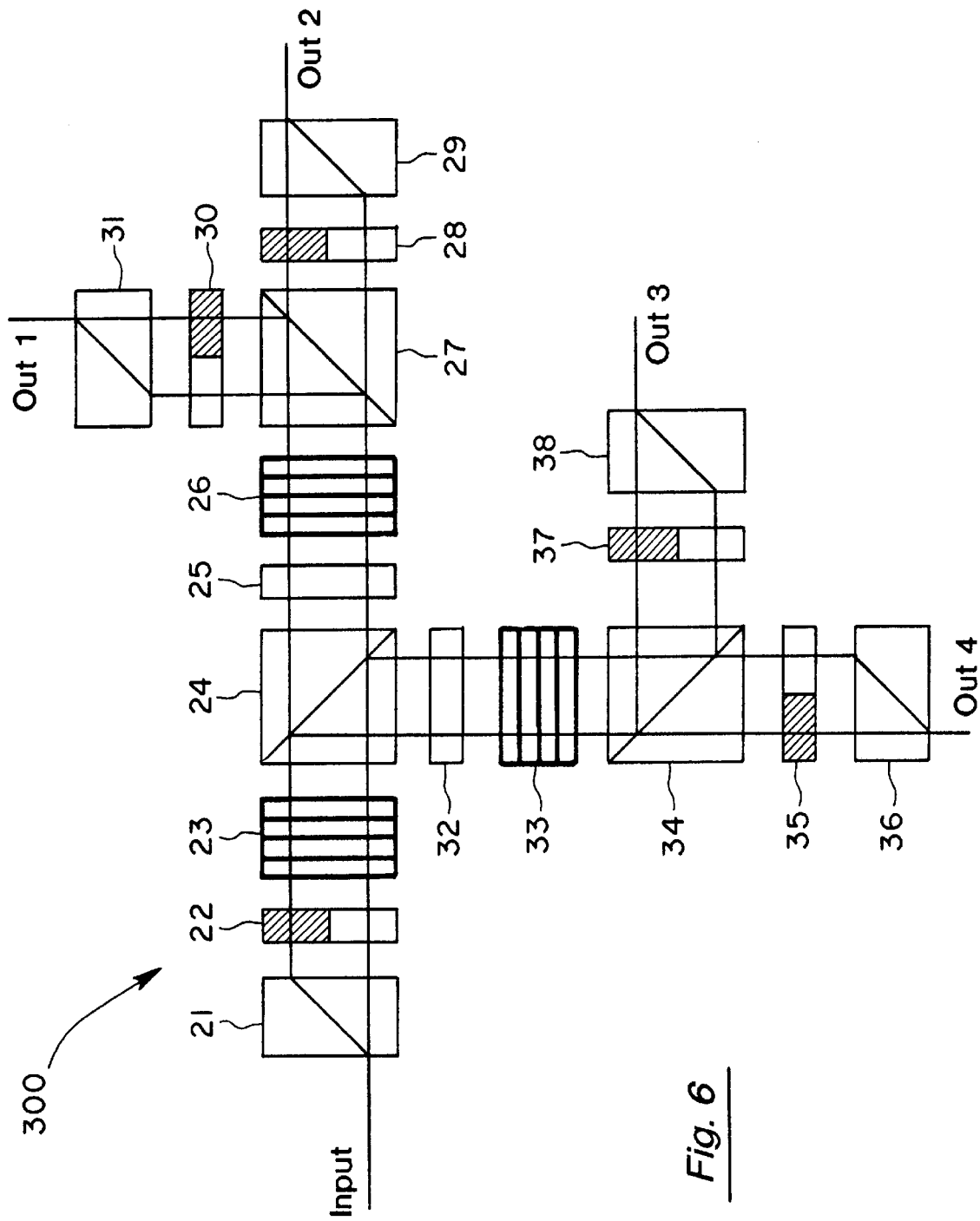
FIG. 6 is a 1×4 wavelength switch based on a tree-structure.

1×4 Wavelength Switch. FIG. 6 is a simplified schematic diagram of an alternative embodiment of a 1×4 wavelength switch using a tree architecture. This tree architecture can be extended to a $1 \times 2^N$ geometry using N stages of cascading. In FIG. 6, the optical input to the wavelength switch is divided by a first polarization separation element 21 (e.g., a first birefringent element) into an orthogonally-polarized pair of beams. These two beams pass through a two-pixel polarization rotator 22 that rotates the polarization of one of the beams so that the state of polarization (SOP) of the two beams is the same (i.e., either vertical or horizontal) depending on the control state of the switch. Both beams then enter a first wavelength filter 23 (e.g., a stacked waveplates element, as previously discussed), in which the input spectrum is separated into two complementary eigen states. The first eigen state carries a first sub-spectrum with the same polarization as the input, while the second eigen state carries a complementary sub-spectrum at the orthogonal polarization. The polarization of the incoming beam and the two output polarizations form a pair of spectral responses, where (H,H) and (V,V) carry the first part of the input spectrum and (H,V) and (V,H) carry the complementary (second) portion of the input spectrum. V and H indicate vertical and horizontal polarizations, respectively. For example, with horizontal polarizations input to the first wavelength filter 23, orthogonal vertical and horizontal polarizations are generated with the first spectral band residing in horizontal polarization and the second spectral band residing in vertical polarization. Alternatively, if vertical polarizations are input to the first wavelength filter 23, orthogonal vertical and horizontal polarizations are generated with the first spectral band residing in vertical polarization and the second spectral band residing in horizontal polarization.

The two polarization-coded spectra exiting the first wavelength filter 23 are separated by the polarization beam separator 24 (e.g., a polarized beamsplitter). The horizontally-polarized components of these beams carry the first part of the spectrum and pass straight through the polarization beam separator 24. The vertically-polarized components of the beams carry the second part of the spectrum and are reflected by 90 degrees.

By switching the control state of the polarization rotator 22, these two spectra are interchanged when their polarization states are changed. This process is complementary and symmetrical as it applies to both arms or branches of the device shown in FIG. 6 to the right and below the polarization beam separator 24. Therefore, the following discussion is equally applicable to both arms of the device.

Both of the sub-spectrum exiting the polarization separator 24 are further modulated by a second polarization rotator 25, 32 that rotates the polarization by either 0 or 90 degrees depending on the control state of the device. Therefore, two SOPs are possible after the second polarization rotator 25, 32. The beam then enters another wavelength filter 26, 33 that has a narrower spectral response than the first wavelength filter 23, and can further slice the spectrum into a smaller bandwidth. A more detailed description of this wavelength slicing concept is set forth in the Applicants' U.S. patent application Ser. No. 08/739,424, entitled "Programmable Wavelength Router." The third and fourth parts of the sub-spectra generated by the second wavelength filter 26, 33 are coded within two orthogonal polarizations and are spatially separated by another polarization separator 27, 34. The vertically-polarized beams are reflected by 90 degrees by the polarization separator 27, 34. The polarization of one of the beams is rotated by the pixelized polarization rotator 30, 37. The resulting orthogonal polarizations carry the first (third) of the four part of the full spectrum is recombined by the polarization combiner 31, 38 and exits to output port 1 (3). In contrast, the horizontally-polarized beams pass straight through the polarization separator 27, 34 and are modulated by the polarization rotator 38, 35. This portion of the light energy carries the second (fourth) part of the spectrum, and is recombined by the polarization combiner 29, 36 and exits at output port 2 (4).

With three control bits for the polarization rotators 22, 25, and 32 used in this wavelength switch, there are a total of $2^3=8$ control states. This design requires fewer optical elements in comparison to the 1×2 wavelength switch discussed above. However, because only one wavelength filter is used for each spectrum slicing, the number of birefringent elements in each wavelength filter 23, 26, and 33 must increase to achieve an equivalent high degree of channel isolation as is possible with the double-stage design in FIG. 4.

Figure 8:
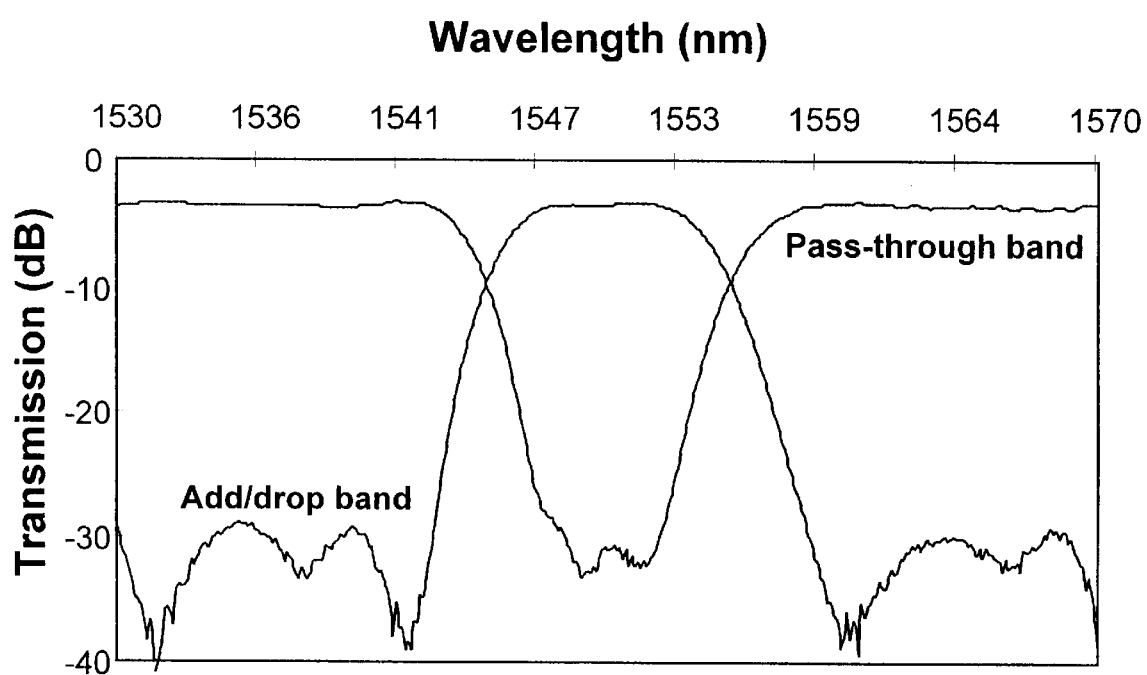
FIG. 8 is a graph showing a design of asymmetric spectra in which the narrower spectrum one can be used as an add/drop port, and the wider spectrum can pass the remainder of the WDM signal back to the network.
Figure 11:
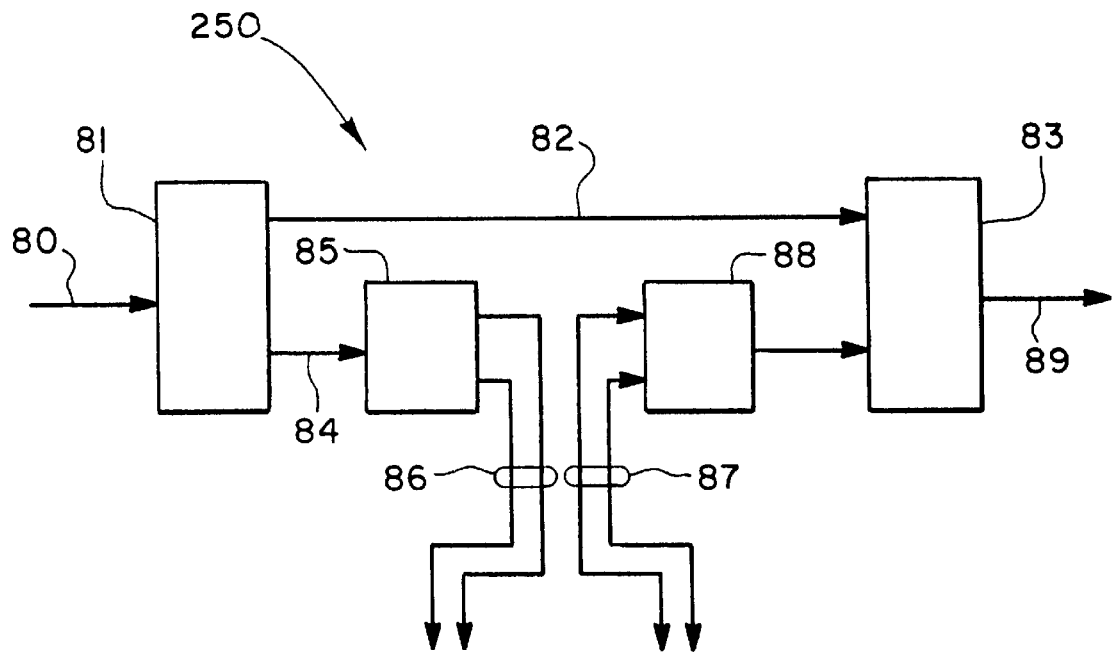
FIG. 11 is a simplified block diagram of an add/drop wavelength cross-connect switch.

Add/Drop Wavelength Switch. FIG. 11 is a simplified block diagram showing an optical add/drop wavelength switch 250 used in the cross-connect network configurations. The add/drop wavelength switch 250 is made by combining a number of 1×2 wavelength switches (see, FIGS. 4a, 4b, 5a, and 5b) using the combinations of control states shown in FIG. 3b. For add/drop operation, asymmetric spectral slicing is preferred. FIG. 8 is an example of asymmetric sub-spectra produced by the stacked waveplates element in the 1×2 wavelength switch, in which one output port carries a much narrower spectral width compared to the other port. This design can be applied to a WDM network when there is a need to add or drop part of the optical channels at an optical exchange node. The add/drop filter can be either passive or active, depending on system design and requirements. The switching element (i.e., the switchable polarization rotator arrays) can be replaced by two passive half-wave plates at each corresponding position of the polarization rotator, such that one of the ports is always designated as the add/drop port. The rest of the optical channels pass through the wavelength router and continue to propagate along the WDM network.

Returning to FIG. 11, the input WDM signal 80 is divided into two parts by the first 1×2 wavelength switch 81. The pass-through channels 82 are passed to the final 1×2 wavelength switch 83 and return uninterrupted through the output port 89 to the network. If desired, the drop channels 84 can be further divided into two sub-spectra 86 by a 1×2 wavelength switch 85. In the embodiment shown in FIG. 11, two add channels 87 are combined by a 1×2 wavelength switch 88, which are then combined with the pass-through channels 82 by the final 1×2 switch 83.

The wavelength switches used in FIG. 11 can be either active or passive or a combination of both. For example, switches 81 and 83 are passive and serve as the primary add/drop spectral separators. The following wavelength switches 85 and 88 actively switch the sub-spectra between the output/input ports 86 and 87. For example, if 16 optical channels are input to port 80, the add/drop wavelength switch can drop the eighth and ninth channels that exit to port 84. These two channels can be further exchanged at the output port of switch 86 under the control of single control bit.

Figure 12:
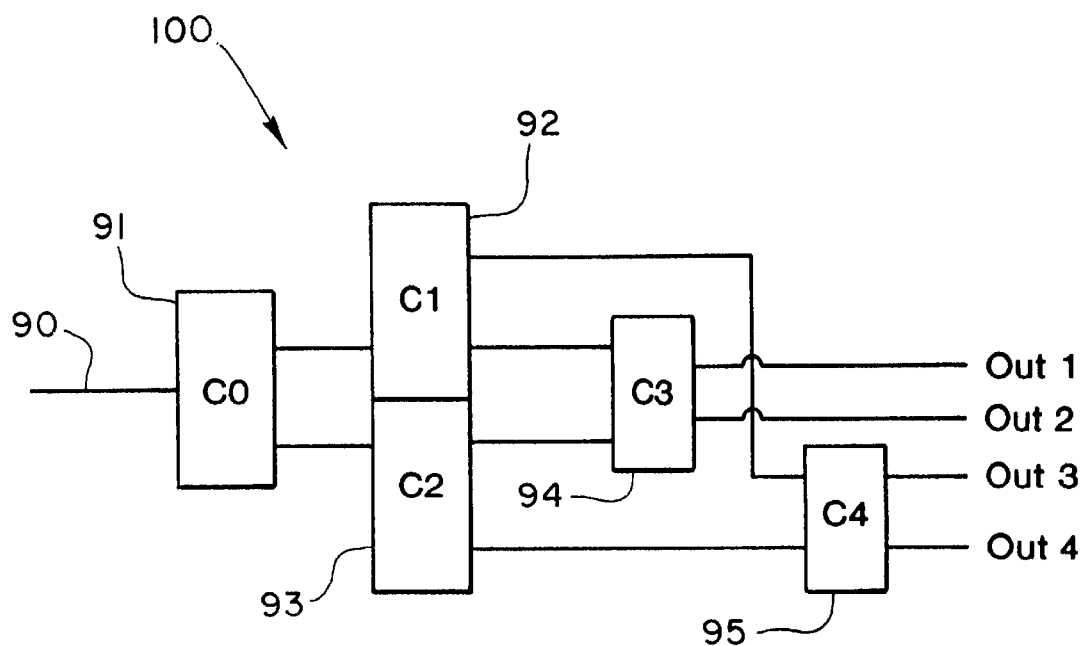
FIG. 12 is a simplified block diagram of an alternative configuration in which two 2×2 wavelength switches 94 and 95 are added to the 1×4 wavelength switch 100 to perform full wavelength permutation.

2×2 Optical Switch. If full permutation is required, two 2×2 optical switches 94 and 95 can be added to the 1×4 wavelength switch, as shown in FIG. 12. As previously discussed, each 1×4 wavelength switch has one port that receives a WDM optical signal, which is separated into four optical channels at the four output ports. The three control bits C0, C1, and C2 allow eight ($2^3$) control states for the 1×4 wavelength switch. However, the embodiments of the 1×4 wavelength switch discussed above are not capable of providing all of the 24 (4!=4×3×2) possible permutations of the four optical channels in the WDM signal. The addition of two 2×2 optical switches 94, 95 allow the optical channels that have been separated by the 1×4 wavelength switches to be rearranged in any desired order. For example in FIG. 3b, channels 1 and 3 and channels 1 and 4 cannot appear simultaneously at ports 1 and 2 due to the wavelength slicing order. However, this can be done with the embodiment shown in FIG. 12.

In this arrangement, a total of five switching elements are required. This results in 32 ($2^5$) states, which is sufficient to cover the full permutation of four wavelengths (i.e., 24 control states). Still, with such an architecture, the number of elements used for the wavelength cross-connect network is less than the conventional approach.

The above disclosure sets forth a number of embodiments of the present invention. Other arrangements or embodiments, not precisely set forth, could be practiced under the teachings of the present invention and as set forth in the following claims.

We claim:

1. In an optical cross-connect network having interconnected arrays of optical wavelength switches providing wavelength routing of optical channels between two arrays of optical fibers carrying WDM signals, the improvement comprising:

a 1×2 optical wavelength switch having:

(a) an input port communicating a WDM signal;

(b) two output ports communicating first and second spectral bands of said WDM signal;

(c) a polarization separation element decomposing said input WDM signal into a first beam and a second beam that have orthogonal polarizations and are spatially separated;

(d) a first polarization rotator having a first control state in which the polarization of said first beam is rotated to substantially match the polarization of said second beam, and a second control state in which the polarization of said second beam is rotated to substantially match the polarization of said first beam; the control state of said first polarization rotator being switchable by an external control signal;

(e) a wavelength filter coupled to receive said first and second beams from said first polarization rotator, said wavelength filter having a polarization dependent optical transmission function such that said first beam decomposes into third and fourth beams with their polarizations orthogonal to each other, and said second beam decomposes into fifth and sixth beams with their polarizations orthogonal to each other, wherein said third and fifth beams carry a first spectral band at a first polarization and said fourth and sixth beams carry a second spectral band at a second polarization, and wherein said first and second spectral bands are substantially complementary and said first and second polarizations are orthogonal;

(f) a polarization-dependent routing element for spatially separating said third, fourth, fifth, and sixth beams into two pairs of orthogonally-polarized beams;

(g) a second polarization rotator for rotating the polarizations of said third, fourth, fifth, and sixth beams such that said third and fifth beams are orthogonally polarized and said fourth and sixth beams are orthogonally polarized; and (h) a polarization combining element for receiving said third, fourth, fifth, and sixth beams from said second polarization rotator, spatially recombining said third and fifth beams containing said first spectral band at one of said output ports based on said control state of first polarization rotator, and spatially recombining said fourth and sixth beams containing said second spectral band at the other of said output ports; and control means for controlling said control state of said first polarization rotator.

2. The optical cross-connect network of claim 1 wherein said first polarization rotator further comprises:

a first area for rotating the polarization of said first beam in said first control state, and passing said first beam without rotation in said second control state; and a second area for passing said second beam without rotation in said first control state, and rotating the polarization of said second beam in said second control state.

3. The optical cross-connect network of claim 1 wherein second polarization rotator further comprises:

a first area for rotating the polarization of said fifth beam;

a second area for rotating the polarization of said sixth beam;

a third area for passing said third beam without rotation; and a fourth area for passing said fourth beam without rotation.

4. The optical cross-connect network of claim 1 wherein said wavelength filter comprises a stacked plurality of birefringent waveplates with each waveplate oriented in a predetermined direction.

5. The optical cross-connect network of claim 1 wherein said arrays of optical wavelength switches comprise 1×N optical wavelength switches made of a plurality of said 1×2 optical wavelength switches.

6. The optical cross-connect network of claim 1 wherein said arrays of optical wavelength switches comprise 1×4 optical wavelength switches, each having:

a first 1×2 optical wavelength switch dividing said WDM signal into two spectral bands; and second and third 1×2 optical wavelength switches in parallel dividing said two spectral bands from said first 1×2 optical wavelength switch into four optical channels.

7. The optical cross-connect network of claim 6 wherein said 1×4 optical wavelength switch further comprises:

a first 2×2 optical switch connected to a selected first and second of said four optical channels, said first 2×2 optical switch switchably reversing the order of said first and second optical channels under the control of said control means; and a second 2×2 optical switch connected to a selected third and fourth of said four optical channels, said second 2×2 optical switch switchably reversing the order of said third and fourth optical channels under the control of said control means.

8. The optical cross-connect network of claim 1 wherein said optical wavelength switch comprises:

a first 1×2 optical wavelength switch dividing an input WDM signal into a predetermined set of drop channels and a complementary set of pass-through channels; and a second 1×2 optical wavelength switch combining said pass-through channels with a predetermined set of add channels to create an output WDM signal.

9. The optical cross-connect network of claim 8 further comprising a third 1×2 optical wavelength switch dividing said drop channels into a predetermined first set of drop channels and a complementary second set of drop channels.

10. The optical cross-connect network of claim 8 further comprising a third 1×2 optical wavelength switch combining a first set of add channels and a second complementary set of add channels to create said add channels for said second 1×2 optical wavelength switch.

11. In an optical cross-connect network having interconnected arrays of optical wavelength switches providing wavelength routing of optical channels between two arrays of optical fibers carrying WDM signals, the improvement comprising:

a 1×2 optical wavelength switch having:

(a) an input port communicating a WDM signal;

(b) two output ports communicating first and second spectral bands of said WDM signal;

(c) a polarization separation element decomposing said input WDM signal into a first beam and a second beam that have orthogonal polarizations and are spatially separated;

(d) a first polarization rotator having a first control state in which the polarization of said first beam is rotated to substantially match the polarization of said second beam, and a second control state in which the polarization of said second beam is rotated to substantially match the polarization of said first beam; the control state of said first polarization rotator being switchable by an external control signal;

(e) a first wavelength filter coupled to receive said first and second beams from said first polarization rotator, said first wavelength filter having a polarization dependent optical transmission function such that said first beam decomposes into third and fourth beams with their polarizations orthogonal to each other, and said second beam decomposes into fifth and sixth beams with their polarizations orthogonal to each other, wherein said third and fifth beams carry a first spectral band at a first polarization and said fourth and sixth beams carry a second spectral band at a second polarization, and wherein said first and second spectral bands are substantially complementary and said first and second polarizations are orthogonal;

(f) a polarization-dependent routing element for spatially separating said third, fourth, fifth, and sixth beams into two pairs of orthogonally-polarized beams;

(g) a second wavelength filter having substantially the same transmission function as said first wavelength filter, wherein said second wavelength filter rotates said third, fourth, fifth, and sixth beams exiting said polarization-dependent routing element back to the same polarization state as said second beam before it enters said first wavelength filter;

(h) a second polarization rotator for rotating the polarizations of said third, fourth, fifth, and sixth beams exiting said second wavelength filter in accordance with said control state of said first polarization rotator, such that said third and fifth beams are orthogonally polarized and said fourth and sixth beams are orthogonally polarized; and (h) a polarization combining element for receiving said third, fourth, fifth, and sixth beams from said second polarization rotator, spatially recombining said third and fifth beams containing said first spectral band at one of said output ports based on said control state of first polarization rotator, and spatially recombining said fourth and sixth beams containing said second spectral band at the other of said output ports; and control means for controlling said control states of said first polarization rotator and said second polarization rotator.

12. The optical cross-connect network of claim 11 wherein said first polarization rotator further comprises:
a first area for rotating the polarization of said first beam in said first control state, and passing said first beam without rotation in said second control state; and
a second area for passing said second beam without rotation in said first control state, and rotating the polarization of said second beam in said second control state.

13. The optical cross-connect network of claim 11 wherein said second polarization rotator further comprises:
a first area for rotating the polarization of said fifth beam;
a second area for rotating the polarization of said sixth beam;
a third area for passing said third beam without rotation; and
a fourth area for passing said fourth beam without rotation.

14. The optical cross-connect network of claim 11 wherein said first wavelength filter comprises a stacked plurality of birefringent waveplates with each waveplate oriented in a predetermined direction.

15. The optical cross-connect network of claim 11 wherein said second wavelength filter comprises a stacked plurality of birefringent waveplates with each waveplate oriented in a predetermined direction.

16. An optical cross-connect network for interconnecting a first array and a second array of optical fibers carrying WDM optical signals having N optical channels, said optical cross-connect network comprising:
a first array of 1×N wavelength switches, each providing wavelength routing between an input port communicating with one of said first array of optical fibers and N output ports for each of said optical channels, said 1×N wavelength switches having a plurality of control states for selectively routing different permutations of said optical channels to said output ports;
a second array of 1×N wavelength switches, each providing wavelength routing between an input port communicating with one of said second array of optical fibers and N output ports for each of said optical channels, said 1×N wavelength switches having a plurality of control states for selectively routing different permutations of said optical channels to said output ports;
interconnection means for providing optical communications between said output ports of said first array of 1×N wavelength switches and said output ports of said second array of 1×N wavelength switches; and
control means for selecting said control states of said first and second arrays of 1×N wavelength switches to provide desired interconnections between the first and second arrays of optical fibers;
wherein said 1×N wavelength switches include a plurality of 1×2 wavelength switches having:

(a) a polarization separation element for decomposing an input WDM signal into a first beam and a second beam that have orthogonal polarizations and are spatially separated;

(b) a first polarization rotator having a first control state in which the polarization of said first beam is rotated to substantially match the polarization of said second beam, and a second control state in which the polarization of said second beam is rotated to substantially match the polarization of said first beam; the control state of said first polarization rotator being switchable by said control means;

(c) a wavelength filter coupled to receive said first and second beams from said first polarization rotator, said wavelength filter having a polarization dependent optical transmission function such that said first beam decomposes into third and fourth beams with their polarizations orthogonal to each other, and said second beam decomposes into fifth and sixth beams with their polarizations orthogonal to each other, wherein said third and fifth beams carry a first spectral band at a first polarization and said fourth and sixth beams carry a second spectral band at a second polarization, wherein said first and second spectral bands are substantially complementary and said first and second polarizations are orthogonal;

(d) a polarization-dependent routing element for spatially separating said third, fourth, fifth, and sixth beams into two pairs of orthogonally-polarized beams;

(e) a second polarization rotator for rotating the polarizations of said third, fourth, fifth, and sixth beams such that said third and fifth beams are orthogonally polarized and said fourth and sixth beams are orthogonally polarized; and (f) a polarization combining element for receiving said third, fourth, fifth, and sixth beams from said second polarization rotator, spatially recombining said third and fifth beams containing said first spectral band and spatially recombining said fourth and sixth beams containing said second spectral band.

17. The optical cross-connect network of claim 16 wherein said first polarization rotator further comprises:

a first area for rotating the polarization of said first beam in said first control state, and passing said first beam without rotation in said second control state; and a second area for passing said second beam without rotation in said first control state, and rotating the polarization of said second beam in said second control state.

18. The optical cross-connect network of claim 16 wherein said second polarization rotator further comprises:

a first area for rotating the polarization of said fifth beam;

a second area for rotating the polarization of said sixth beam;

a third area for passing said third beam without rotation; and a fourth area for passing said fourth beam without rotation.

19. The optical cross-connect network of claim 16 wherein said wavelength filter comprises a stacked plurality of birefringent waveplates with each waveplate oriented in a predetermined direction.

20. The optical cross-connect network of claim 16 wherein said 1×N optical wavelength switches are 1×4 optical wavelength switches, further comprising:

a first 1×2 optical wavelength switch dividing said WDM signal into two spectral bands; and second and third 1×2 optical wavelength switches in parallel dividing said two spectral bands from said first 1×2 optical wavelength switch into four optical channels.

21. The optical cross-connect network of claim 20 wherein said 1×4 optical wavelength switch further comprises:

a first 2×2 optical switch connected to a selected first and second of said four optical channels, said first 2×2 optical switch switchably reversing the order of said first and second optical channels under the control of said control means; and a second 2×2 optical switch connected to a selected third and fourth of said four optical channels, said second 2×2 optical switch switchably reversing the order of said third and fourth optical channels under the control of said control means.

* * * * *

UNITED STATES PATENT AND TRADEMARK OFFICE
CERTIFICATE OF CORRECTION

PATENT NO : 6,005,697
DATED : December 21, 1999
INVENTOR(S) : Wu et al.

It is certified that error appears in the above-identified patent and that said Letters Patent is hereby corrected as shown below:

Column 1, line 3, insert the heading, -- Government Interests --

As a separate paragraph, after the heading, please insert the following,

-- The invention was made with Government support under Contract DARPA I: DAAH01-96-C-R263 awarded by U.S. Army Missile Command, AMSMI-AC-CRAY, Redstone Arsenal, AL 35898. The Government has certain rights in the invention. --

Signed and Sealed this

Fifteenth Day of May, 2001

Attest:

NICHOLAS P. GODICI

*Attesting Officer*    *Acting Director of the United States Patent and Trademark Office*